(12) United States Patent
O'Grady

(10) Patent No.: US 7,537,270 B2
(45) Date of Patent: May 26, 2009

(54) AIR FOIL

(75) Inventor: Michael O'Grady, Martinez, GA (US)

(73) Assignee: Volare Airfoils, LLC, Martinez, GA (US)

( * ) Notice: Subject to any disclaimer, the term of this patent is extended or adjusted under 35 U.S.C. 154(b) by 0 days.

(21) Appl. No.: 11/602,594

(22) Filed: Nov. 21, 2006

(65) Prior Publication Data

US 2008/0116716 A1  May 22, 2008

(51) Int. Cl.
*B62D 37/02* (2006.01)
(52) U.S. Cl. .................. 296/180.4; 296/180.1
(58) Field of Classification Search .............. 296/180.1, 296/180.2, 180.3, 180.4, 180.5
See application file for complete search history.

(56) References Cited

U.S. PATENT DOCUMENTS

| | | | |
|---|---|---|---|
| 4,142,755 | A | 3/1979 | Keedy |
| 4,236,745 | A | 12/1980 | Davis |
| 4,702,509 | A | 10/1987 | Elliott, Sr. |
| 4,741,569 | A | 5/1988 | Sutphen |
| 4,818,015 | A | 4/1989 | Scanlon |
| 4,978,162 | A | 12/1990 | Labbe |
| 5,058,945 | A | 10/1991 | Elliott, Sr. et al. |
| 5,332,280 | A | 7/1994 | DuPont et al. |
| 5,348,366 | A | 9/1994 | Baker et al. |
| 5,375,903 | A | 12/1994 | Lechner |
| 5,908,217 | A | 6/1999 | Englar |
| 5,947,548 | A | 9/1999 | Carper et al. |
| 6,309,010 | B1 | 10/2001 | Whitten |
| 6,409,252 | B1 | 6/2002 | Andrus |
| 6,467,833 | B1 | 10/2002 | Travers |
| 6,485,087 | B1 | 11/2002 | Roberge et al. |
| 6,595,578 | B1 | 7/2003 | Calsoyds et al. |
| 7,008,005 | B1 | 3/2006 | Graham |

FOREIGN PATENT DOCUMENTS

GB  2 148 207 A  5/1985

OTHER PUBLICATIONS

Stephen Wilkinson, "Go With the Flow", Air & Space Magazine, Jun./Jul. 1995.
McCallen et al., "DOE's Effort to Reduce Truck Aerodynamic Drag-Joint Experiments and Computations Lead to Smart Design", LLNL, UCRL-CONF-204819, 1994.
Englar, "Project Focus", Georgia Tech Alumni Notes, vol. 1, Issue 3, Spring 2005.
Englar, "Flying Low-Drag Trucks", Georgia Tech Research News, Oct. 24, 2000.
Englar, "Improving Truck Performance with Pneumatics", GTRI/ATLAS Laboratory.

*Primary Examiner*—Lori L Lyjak
(74) *Attorney, Agent, or Firm*—Kenneth A. Buffington

(57) ABSTRACT

An airfoil which has one or more laminar flow control features to enhance the aerodynamic performance of bluff body vehicles such as buses and truck-tractor trailer rigs. Theses features include a combination of curved and tapered airfoil surfaces, air ejectors or other vacuum producing devices that reduces the air drag over the moving surface. The basic form of structure is a hollow curved and tapered airfoil surface with its base mounted against the rear vehicle wall with hinges such that the airfoil can be folded back against the side of the vehicle.

28 Claims, 10 Drawing Sheets

AIR FOIL

TECHNICAL FIELD

The present invention generally relates aerodynamic enhancements for bodies moving through a fluid and, more particularly, to airfoils for vehicles.

BACKGROUND

The boxy shape of conventional tractor-trailer combinations is dictated by a need to provide a large cargo volume within the maximum allowable dimensions that are fixed by law. In the past, the low aerodynamic efficiency of these vehicles was considered of little importance. However, the high cost and uncertain availability of fossil fuels has increasingly focused attention on reducing the aerodynamic drag that accounts for more than half of the fuel consumption of large trucks in long-haul highway operations on fairly level pavement at high speed. These conditions correspond to normal Interstate Highway Conditions.

The potential economic benefit of drag-reduction apparatus can be evaluated based on the fuel that would be saved using the apparatus, the saving being independent of vehicle weight load and rolling resistance. For example, a conventional tractor-trailer combination weighing about 30 to 80,000 pounds and having a cross-sectional area of 100 square feet and a drag coefficient of 0.55 typically consumes about 16 gallons of diesel fuel per hundred miles at 60 MPH, on nearly level ground. The fuel costs $40 at a price of $2.50 per gallon. The truck requires about 165 horsepower to overcome about 150 pounds of rolling friction and internal loading and about 975 pounds of aerodynamic drag. A ten percent reduction in the aerodynamic drag results in a savings of $(97.5/550)*60*(88/60)=15.6$ HP. This is equivalent to a savings of about 1.83 gallons or $4.57 per hundred miles, independent of vehicle loading. On a trip of 2,000 miles, the savings is more than $91.50.

At higher speeds, air drag is exponentially greater and there is a corresponding greater reduction in drag for even greater savings. For example, on a 2,000 mile trip at an increased speed of 70 MPH, the resulting aerodynamic drag increases 45% and a ten percent reduction results in a savings of about $128 in fuel costs.

Further, when the effects of wind are considered, the potential savings are even greater. Moreover, the cost and availability of diesel fuel are subject to change, potentially making aerodynamic drag a critical factor in shipping economy.

Lastly, the airfoil shape, although designed for fuel economy, and foreshortened to comply with existing regulations for vehicles on the National Network and the highways of the several states, will nonetheless provide an important increase in the dynamic stability of those vehicles upon which it is installed, while posing no increased hazard to other vehicles or their passengers.

Although there are a variety of devices in the prior art for improving the aerodynamics of truck vehicles, these devices exhibit a variety of disadvantages. For example, many simply are ineffective because they provide little or no actual drag reduction in use. Some are awkward to use because they interfere with normal loading and maintenance operations. Others are heavy and bulky, being difficult to install, remove, and store when not in use. Many are unsafe because they tend to interfere with lighting visibility and most are costly to produce and install. Most of these devices are not in compliance with existing state laws which regulate maximum width and length of vehicles. Most of these devices do not satisfy the conditions of the federal regulations which mandate exclusions to said state laws for the purpose of facilitating aerodynamic enhancement of bluff body vehicles.

Thus, there remains a need for alternative devices and systems for enhancing the aerodynamic performance of a vehicle.

SUMMARY

The present invention generally is directed to systems and airfoils for enhancing the aerodynamic performance of a land-based vehicle, especially vehicles having bluff bodies, such as buses and truck-tractor trailer rigs. The airfoils generally include one or more Laminar Flow Control (LFC) features that can reduce the drag caused by air flowing over a moving surface. The LFC features generally can include curved and tapered airfoil surfaces, air ejectors or other vacuum producing devices, flow control apertures and flow control stubs and/or dimpled surfaces. The apertures under vacuum, the flow control subs, and the dimples are features which reduce the level of energy in the boundary layer of the air passing over the surface upon which they are placed or imbedded. As such, they can be used interchangeably or preferentially as dictated by operating conditions, or by manufacturing economics. These features can be employed independently or in various combinations to enhance the laminar flow of fluid around the vehicle. These LFC features generally can be included in an airfoil for a bluff body vehicle, such as a bus or tractor-trailer rig, as well as other types of trailers, automobiles and land-based vehicles. Each of these LFC features also includes alternative embodiments that can be employed alone, in combination with each other and in combination with the various embodiments of the other LFC features.

The airfoil generally can include a body or bodies having thereon at least two laminar flow control features selected from a curved and tapered airfoil surface, a flow control aperture, a flow control stub, a dimpled surface, a vacuum pump, and an air ejector. With the combination of a flow control aperture and an air ejector, the two can be in fluid communication. Furthermore, the two can be in fluid communication with a plenum formed in the body, wherein the plenum exhibits an air pressure lower than the pressure on the outer surface of the body. With a curved and tapered airfoil surface formed on the body, the air ejector can be disposed in the curved and tapered airfoil surface. Alternative combinations of any two, three and all four of the laminar flow control features are contemplated.

In one embodiment, the airfoil includes a body with an outer face that includes first and second major slopes and first and second minor slopes. The first and second major slopes are opposedly aligned with each other and terminate at an elongated vertex. The first and second minor slopes also are opposedly aligned with each other at opposed ends of the elongated vertex. An air ejector is formed in the elongated vertex and acts to draw air from the outer face of the body, when vehicle to which the foil is mounted is in motion. The airfoil can include one or more flow control apertures formed in the outer face of the body. Pluralities of flow control apertures and/or flow control stubs can be disposed on one or more of the major and minor slopes.

The alignment of the flow control apertures and stubs can vary depending upon their placement. For example, the flow control apertures and stubs can be aligned substantially perpendicular to the adjacent portion of the outer face in which they are disposed. They can be frustoconical or include a major diameter. The airfoil can be formed of a first section releasably connected to a second section. In such an embodiment, the first major slope of the outer face can be formed on the first section and the second major slope formed on the second section. Also, the airfoil can be removably or hingedly attached to the vehicle so as, for example, to facilitate access to the interior of the trailer of a tractor-trailer rig or other vehicle. This attachment may allow the continued use of the existing traditional rear doors or other access devices of the trailer or vehicle, if such items exist. The airfoil can be mounted to the vehicle by a hinge that has a pair of pins disposed in opposed ends of an elongated shank to allow for the body or bodies of the airfoil to folded back against the side of the vehicle.

In another embodiment, an airfoil is provided also with a body or bodies having an outer face. A curved and tapered airfoil surface is disposed on the outer face and an air ejector is formed in the curved and tapered airfoil surface. A plurality of flow control apertures is formed in the outer face of the body. The air ejector and the plurality of flow control apertures can be in fluid communication with a plenum formed at least in part by the body of the airfoil. When the vehicle is in motion, the pressure within the plenum can be less than that on the surface of the outer face, thereby leading to air flow through the flow control apertures from the outer face into the plenum and then through the ejector and out of the airfoil. A vacuum pump can be in fluid communication with the air ejector and/or plenum and/or flow control apertures. A pressure differential can be created by the pump so as to draw air from the outer surface of the body of the airfoil so as to affect the flow properties of the air or fluid flowing over the vehicle.

A system for reducing drag on a vehicle caused by fluid turbulence also is encompassed by the present invention. The system generally includes a curved and tapered airfoil surface disposed on the rear of the vehicle and a plurality of flow control apertures also provided on the rear of the vehicle. Air flowing over the rear of the vehicle, when the vehicle is in motion, is drawn into the plurality of flow control apertures. An air ejector also can be provided in fluid communication the plurality of flow control apertures with air exiting the air ejector. A pump can be provided in fluid communication with the plurality of flow control apertures to assist in the movement of air. Additionally, the system can include a skirt mounted over the top and sides of the vehicle and engaging the body. The skirt can have one or more flow control stubs or other of the LFC features formed thereon for providing additional aerodynamic enhancement.

These and other features of the present invention are set forth in more detail below and illustrated in the drawings which are briefly described as follows.

DETAILED DESCRIPTION

Figure 1:
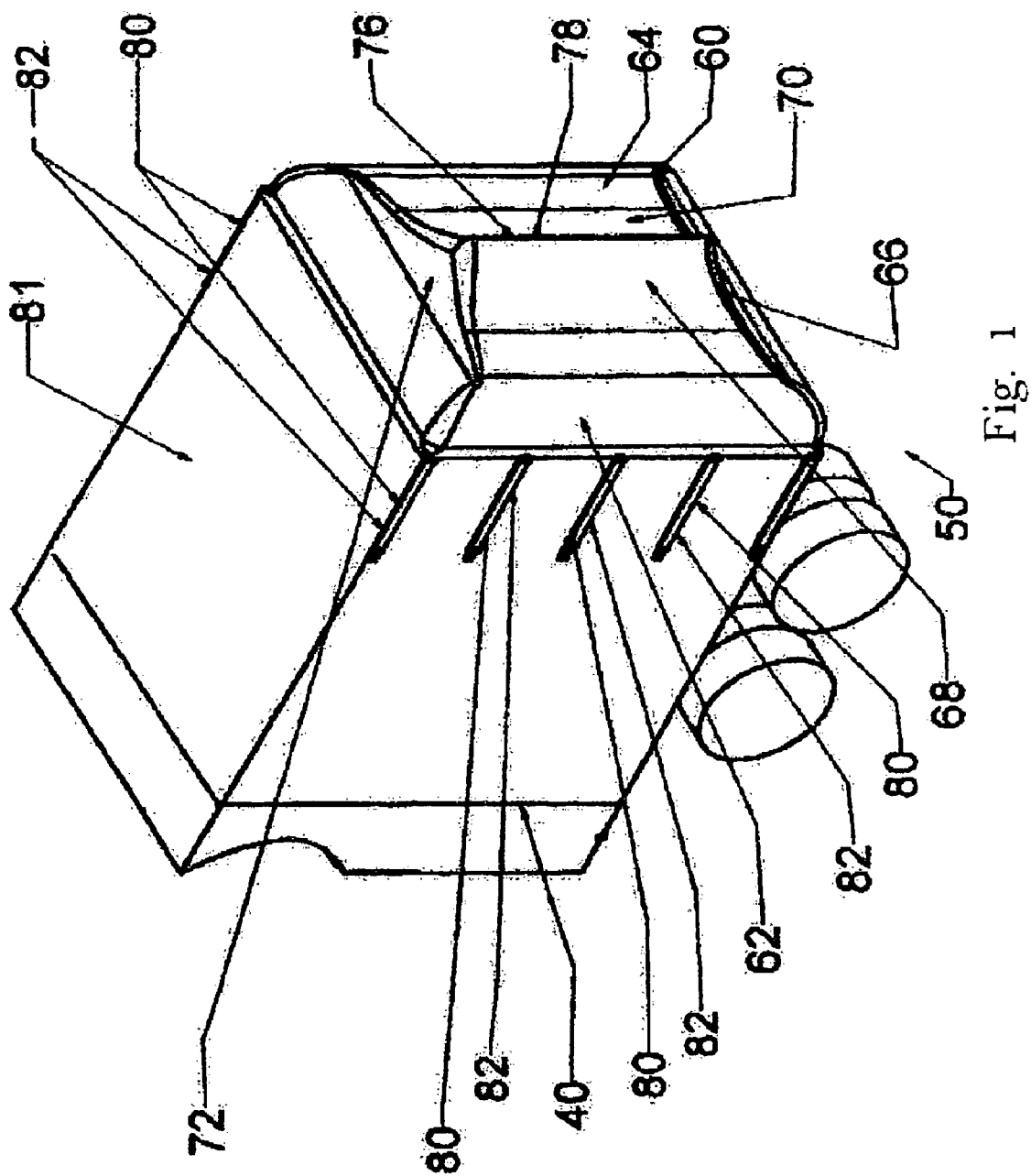
FIG. 1 is a perspective view of system with an airfoil mounted on a vehicle and which encompasses aspects of the present invention.

Referring now to the drawings where like numerals refer to like components throughout the several views, FIGS. 1-10 illustrate systems, airfoils and LFC features that tend to reduce drag generated by air flowing over a moving vehicle. The systems, airfoils and LFC features disclosed herein can be utilized on a variety of land-based vehicles and especially bluff body vehicles, such as buses, vans and tractor trailer rigs. As used herein, the term "bluff body vehicle" refers to land-based vehicle having a broad flat or rounded front or rear. The systems and airfoils generally employ one or more LFC features selected from curved and tapered airfoil surfaces, air ejectors, flow control apertures, dimples, and flow control stubs. These LFC features tend to reduce turbulence and/or increase laminar flow about the surface of the vehicle. The airfoil may be connected to the bluff body by a hinge, or a plurality of hinges which, by their unusual length and unique arrangement, may facilitate the use of existing access doors, or other portals which satisfy the existing requirements for security, weather protection, and load stability. Alternatively, the airfoil may replace these existing doors and other portals and satisfy those aforementioned requirements.

As used herein, the term "air ejector" refers to a feature of the system that directs air through a pressure differential out of the system and into the low pressure air stream flowing behind the vehicle. The term "flow control aperture" refers to an opening formed in a portion of the airfoil or system at a surface that is exposed to air flowing over the moving vehicle and through which such air is drawn. The term "curved and tapered airfoil surface" refers to a feature of the airfoil or system that prolongs the rear of the vehicle and generally has a diminishing cross-section. The curved and tapered airfoil surface can direct two or more streams of air flowing over the vehicle into substantially one stream. The term "dimple" refers to an indentation on the surface of the airfoil, generally of the same dimensions as the aforementioned flow control apertures, which dimples, however, do not penetrate the body of the curved and tapered airfoil surface or other surface upon which they are positioned. The term "flow control stub" refers to a protuberance projecting from a surface of the airfoil or system that is exposed to air flowing over the moving vehicle and, by its location and configuration, tends to promote laminar flow within the air stream.

A bluff body vehicle 40 is shown in FIG. 1 with a system 50 for reducing drag when the vehicle 40 is in motion. The system 50 includes an airfoil 60 mounted to the rear of the vehicle 40. The vehicle 40 is shown as the trailer of a typical tractor trailer rig, but can be any type of bluff body vehicle. The airfoil 60 includes a body 62 that has a rearward facing outer face 64.

The outer face 64 has formed thereon a first major slope 68 that is opposedly aligned with a second major slope 70. The first and second major slopes 68 and 70 meet at an elongated vertex 76. As shown in FIG. 1, the elongated vertex 76 is aligned vertically, however, the elongated vertex 76 also can be aligned generally horizontally on the rear of the vehicle 40.

A first minor slope 72 is opposedly aligned with a second minor slope 74 at opposed ends of the elongated vertex 76. The major and minor slopes 68, 70, 72 and 74 cooperate to form the curved and tapered airfoil surface 66 on the outer face 64 of the body 62. The curved and tapered airfoil surface 66, generally a tapering structure, is configured to direct two or more air streams towards each other. An air ejector 78 is disposed in the curved and tapered airfoil surface 66 and opens at the elongated vertex 76. Air is directed through the air ejector 78 out of the curved and tapered airfoil surface 66 into ambient when the vehicle is in motion.

Figure 6:
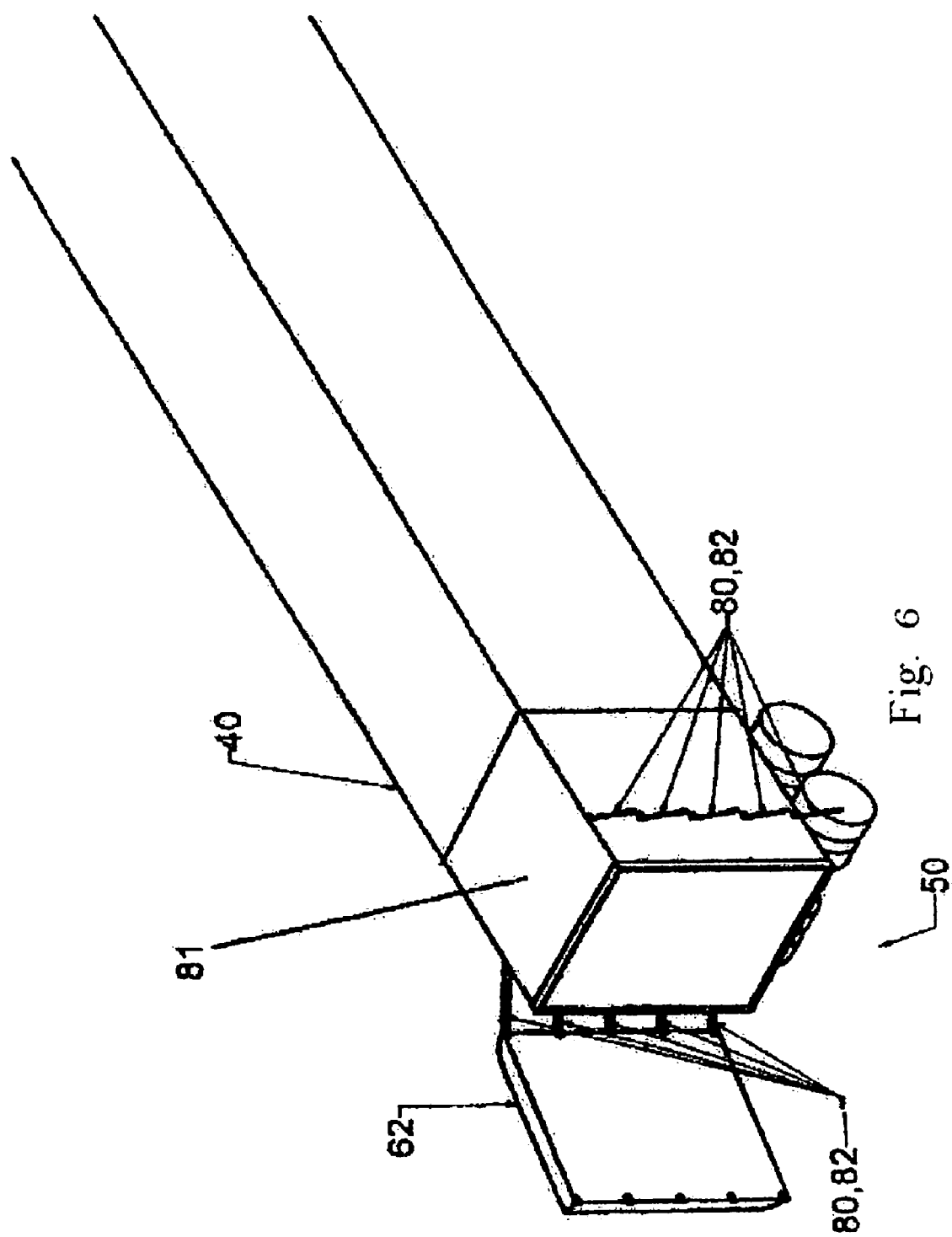
FIG. 6 is a perspective view of the system of FIG. 1 with the airfoil partially unhinged.
Figure 7:
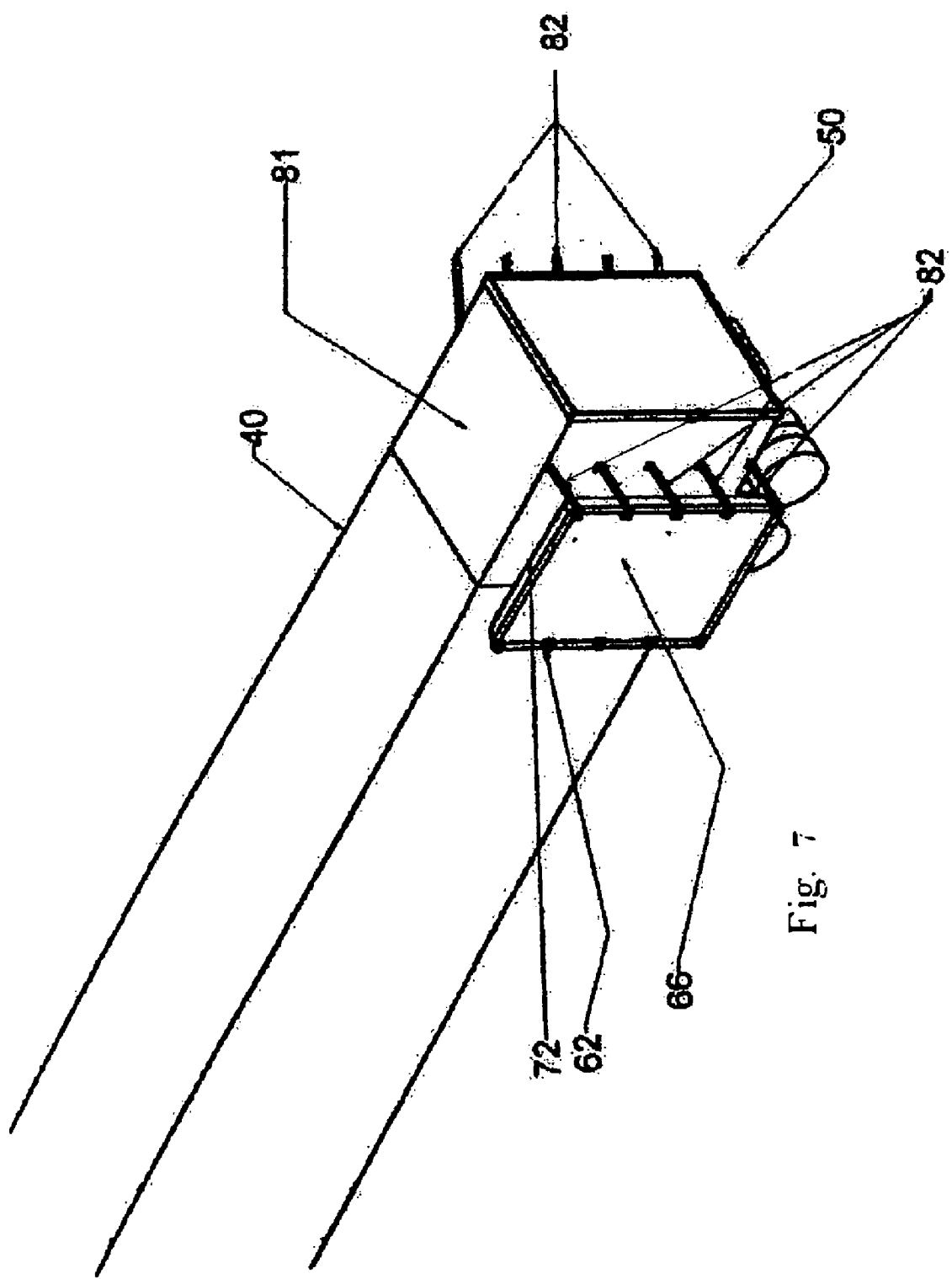
FIG. 7 is a perspective view of the system of FIG. 1 with the airfoil in a stowed position.
Figure 10:
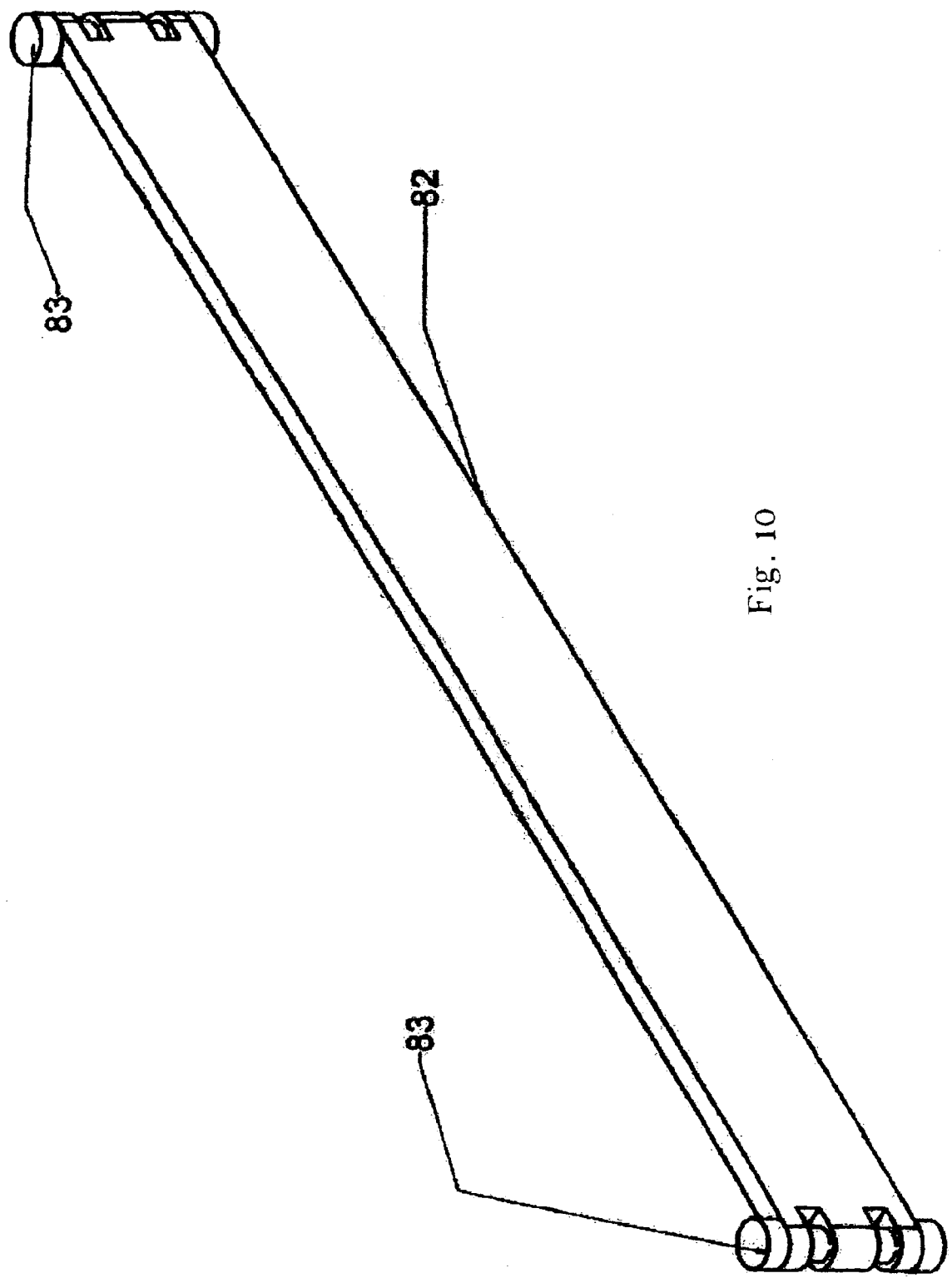
FIG. 10 is a perspective view of an elongated shank of the system shown in FIG. 1.

The body 62 is mounted to the vehicle 40 by one or more hinges 80. As shown in FIG. 1, a plurality of hinges 80 are attached to both sides of the vehicle 40 and the body 62 when secured. Each hinge 80 includes an elongated shank 82, as shown in FIG. 10. The elongated shank 82 has eyelets disposed on either end thereof in which pivot pins 83 are disposed. As shown in FIG. 6, the body 62 can be releasably connected to both sets of hinges 80 so that the body 62 can be swung away from the rear door of the vehicle 40 to either side. One of the pivot points provided by the elongated shank 82 allows the body 62 to pivot away from the rear of the vehicle 40 and the other pivot point allows the body 62 to be pivoted adjacent the side of vehicle 40. As shown in FIG. 7, the elongated shank 82 is approximately the same length as or slightly longer than the depth of the body 62 from the elongated vertex 76 to the edge of the outer face 64. Thus, using the hinges 80, the body 62 can be stored against either side of the vehicle 40.

The body 62 of the airfoil 60, as shown in FIGS. 2-5, generally is a hollow contoured shell having an outer face 64. The first major slope 68 and the second major slope 70 are formed on the outer face 64 of the body 62 and extend from the side edges of the outer face 64 to the elongated vertex 76, which is vertically aligned in the center of the outer face 64. The first and second major slopes 68 and 70 are congruent and include differing grades at various points along their length. At opposed ends of the elongated vertex 76, the first minor slope 72 and the second minor slope 74 extend from the top and bottom edges of the outer face 64, respectively, to the opposed ends of the elongated vertex 76. The first and second minor slopes 72 and 74 also can be congruent and include various grades at different points along their expanses. The curvatures of the major and minor slopes 68, 70, 72 and 74 shown in FIGS. 2-5 can be double cycloids aligned back to back, as well as other configurations.

The major and minor slopes 68, 70, 72 and 74 cooperate to form the curved and tapered airfoil surface 66. As shown in FIG. 1, the curved and tapered airfoil surface 66 generally is aligned along the center of the rear of the vehicle 40, much like a fish tail. However, unlike a fish tail, the curved and tapered airfoil surface 66 extends a relatively short distance beyond the rear end of the vehicle 40. For example, the distance between the rear end of the vehicle 40 and the elongated vertex 76 can be less than half the width of the vehicle 40. Alternatively, this distance can be up to about the full width of the rear end of the vehicle 40. More particularly, the depth of the body 64 from the edges to the elongated vertex 76 can be about 20 to about 40 inches. In one particular embodiment, the depth is about 28 inches.

Figure 2:
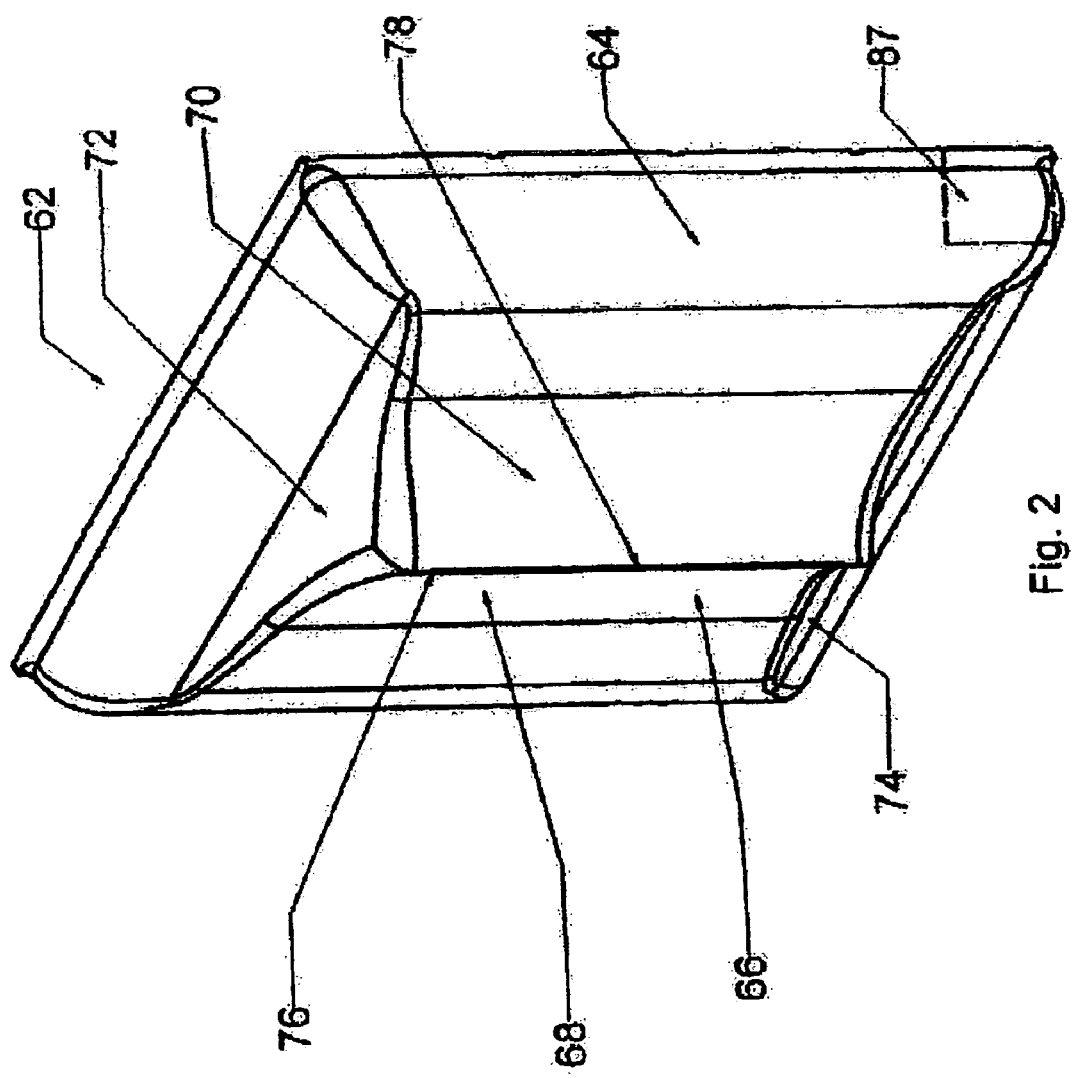
FIG. 2 is a perspective view of the body of the airfoil of FIG. 1.
Figure 3:
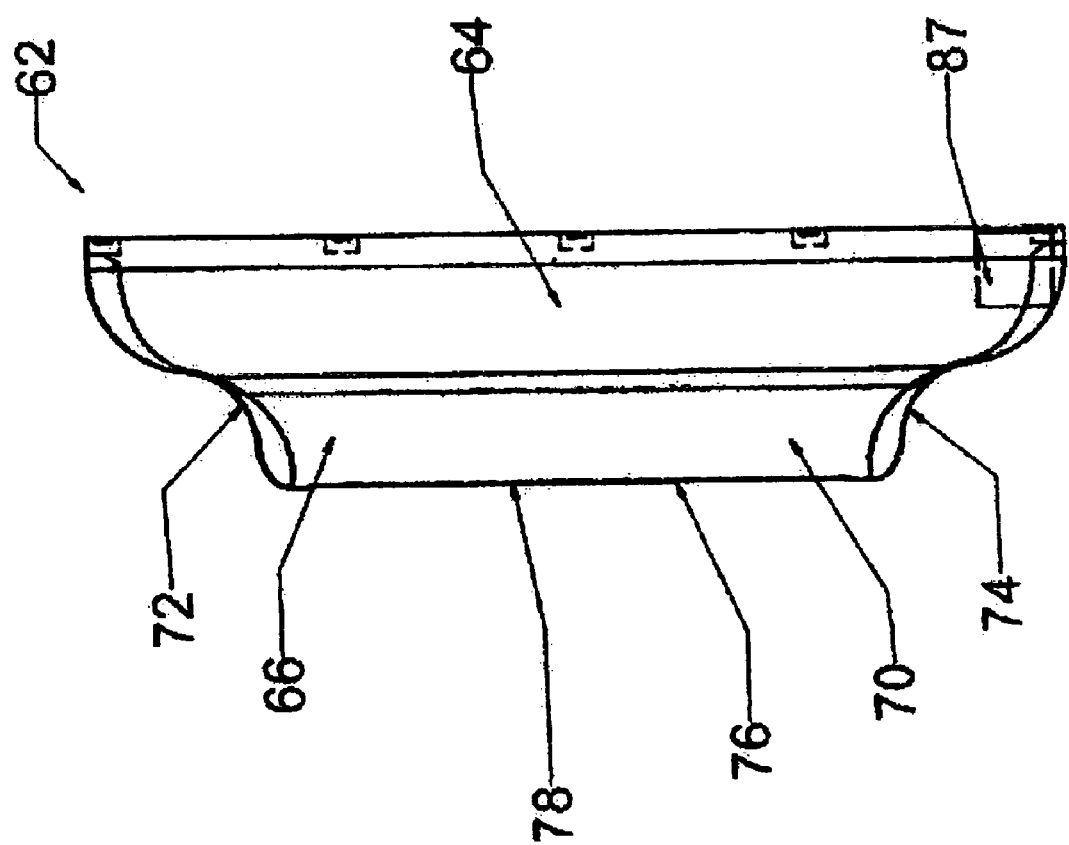
FIG. 3 is a side view of the body of the airfoil of FIG. 1.
Figure 4:
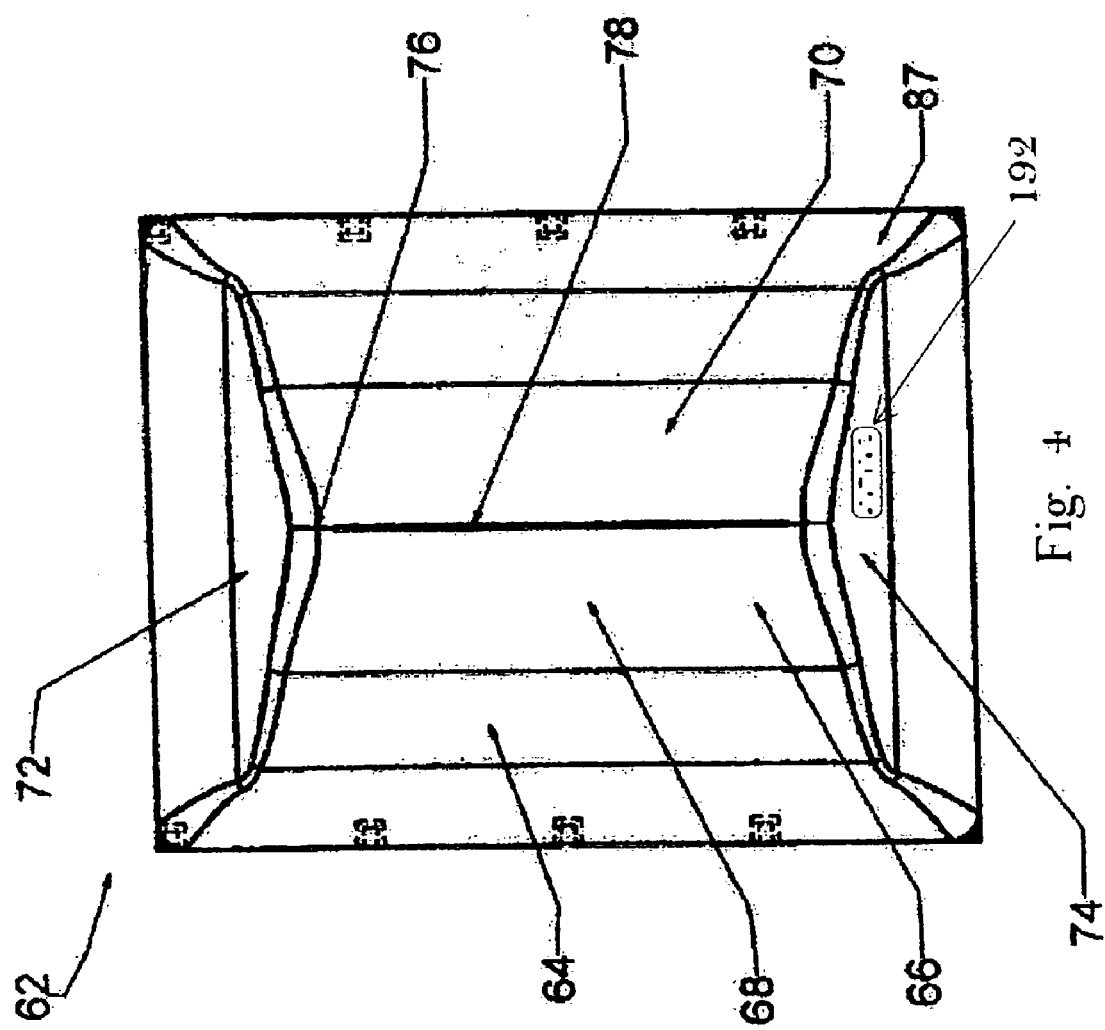
FIG. 4 is a front view of the body of the airfoil of FIG. 1.
Figure 5:
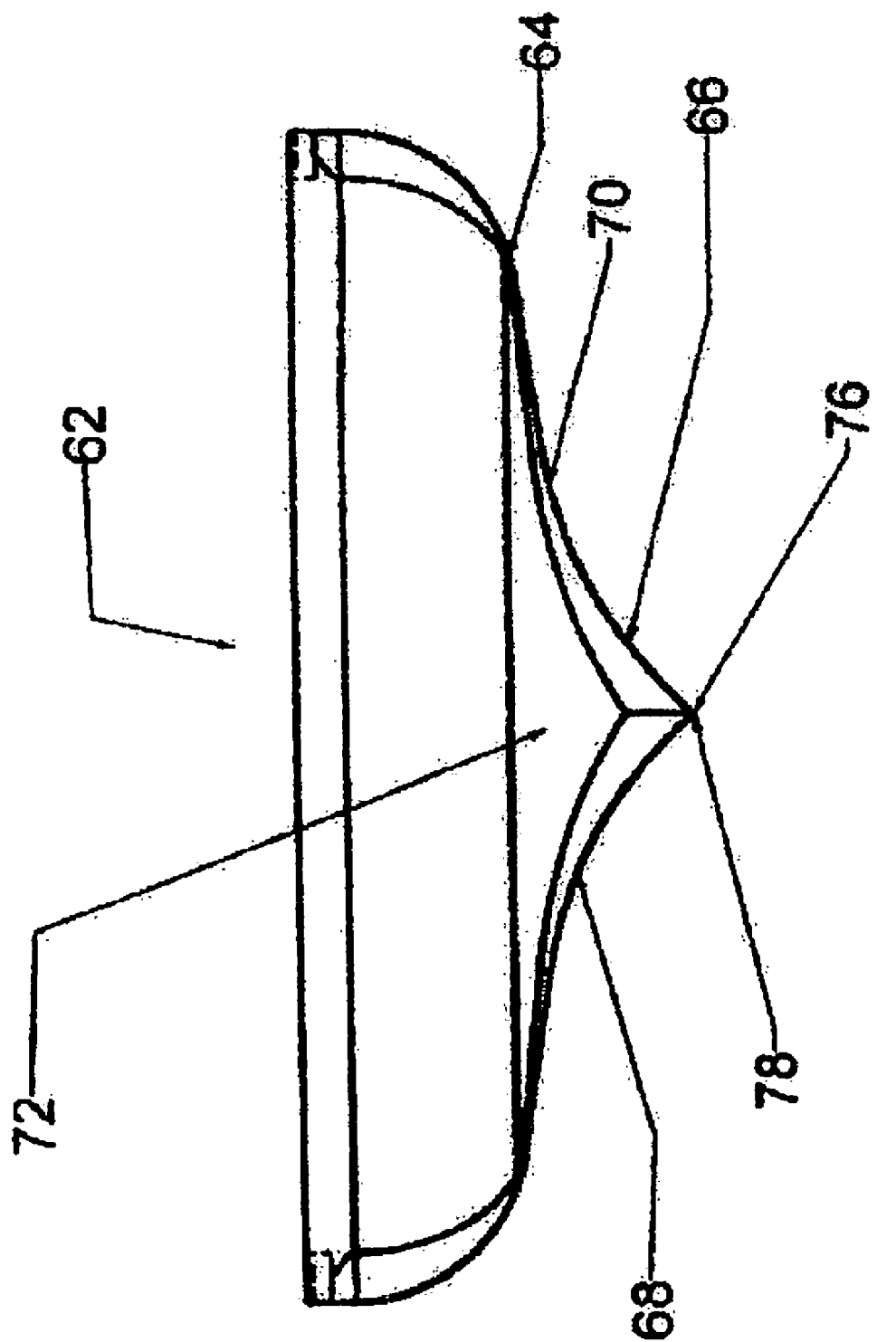
FIG. 5 is a top view of the body of the airfoil of FIG. 1.

The air ejector 78 disposed in the elongated vertex 76 of the outer face 64 of body 62, as shown in FIGS. 2 and 4, is a single elongated slot. However, multiple air ejectors of various configurations also are contemplated. The air ejector 78 can be in fluid communication with one or more flow control apertures 90 formed on the body 62 and/or an air pump 87 mounted to the vehicle 40.

In addition to an air ejector 78 and a curved and tapered airfoil surface 66, the body 62 of airfoil 60 can include one or more flow control apertures 90 and flow control stubs 192 on the surface. The flow control apertures 90 can be formed on any one or more of the major and minor slopes 68, 70, 72 and 74. For example, as shown on FIG. 9, the flow control apertures 90 are formed on slope 72. The flow control aperture 90 has a major diameter A, which generally can be aligned parallel to the direction of the air flowing over the aperture. The flow control aperture 90 can have a slit or elliptical opening at surface of the outer face 64. The flow control aperture 90 can be aligned generally perpendicularly to the immediately adjacent surface of the airfoil. Also, the flow control aperture 90 can be frustoconical so as to reduce the likelihood that the aperture becomes clogged with dirt or debris.

While the flow control stubs 192 can be positioned on any of the slopes of the outer face 64, certain particular embodiments include flow control stubs 192 aligned on the lower portion of the airfoil 60. For example, as shown on FIG. 4, the flow control stubs 192 are on the second minor slope 74. The flow control stub 192 can be provided on the airfoil 60 and have a major diameter B that generally is aligned parallel to the air flow at that particular position.

The system 50 shown in FIG. 1 also can include a skirt 81 that extends over the sides and top of vehicle 40. The skirt 81 can engage or be aligned adjacent to without actually touching the body 62 of airfoil 60. The skirt 81 can serve as the upstream portion of the system 50 so as to provide improved laminar flow properties along the length of the vehicle 81. The skirts 81 provided herein can be of varying lengths and extend varying distances along the lengths of the vehicles 40 to which they are attached, depending upon the overall length of the vehicle and the typical speeds at which the vehicle travels. The skirt 81 can include thereon one or more flow control stubs 192 in appropriate positions to further enhance the aerodynamic profile of the vehicle 40. The skirt 81 can be formed of rubber or another suitable polymeric material. In one embodiment, the skirt 81 extends about to the total length of the vehicle 40. The length of an abbreviated skirt can be about 1 inch to about 10 inches.

Figure 8:
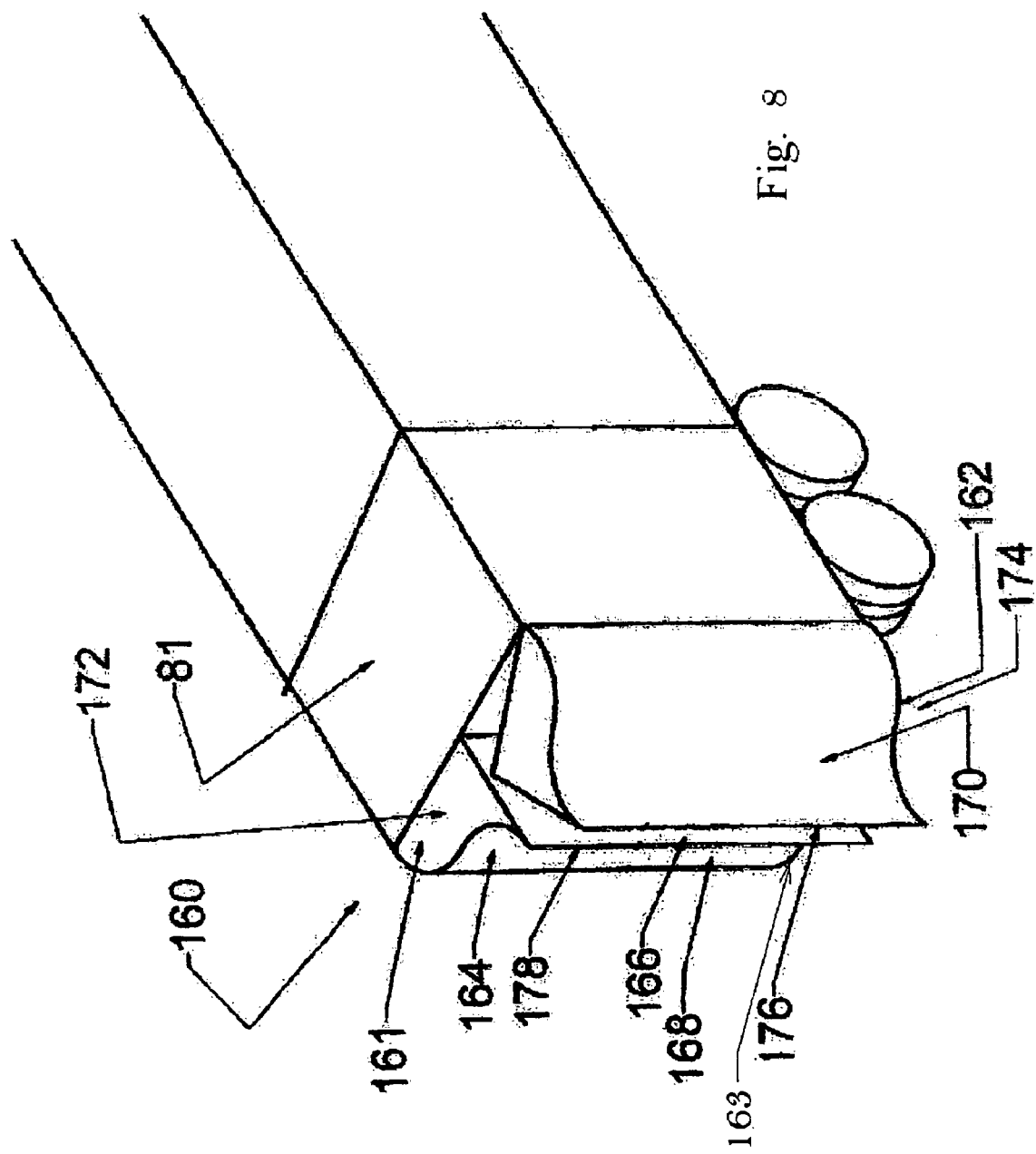
FIG. 8 is a perspective view of another airfoil mounted to a vehicle and encompassing aspects of the present invention.

In FIG. 8, another embodiment of an airfoil 160 is provided. Like the embodiment of the airfoil 60, shown in FIG. 1, the body 162 of the airfoil 160 includes first and second major slopes 168 and 170 opposedly aligned with each other and meeting at an elongated vertex 176, and first and second minor slopes 172 and 174 aligned at opposed ends of the elongated vertex 176. However, whereas the body 62 of airfoil 60 is unitary in construction, the body 162 of airfoil 160 is formed of a first section 161 and a second section 163. The first and second sections 161 and 163 are hingedly mounted to the rear of the vehicle 40 and can be releasably connected to each other, such as by inter locking tabs, latches and the like. When connected, the first and the second sections 161 and 163 form the curved and tapered airfoil surface 166. The first and second minor slopes 170 and 174 also are formed in part by each of the first and second sections 161 and 163, whereas the first major slope 168 is disposed completely on the first section 161 and the second major slope 170 is disposed completely on the second section 163.

An air ejector 178 is formed within the curved and tapered airfoil surface 166 and includes two openings that are separated from each other. Pluralities of flow control apertures 90 are distributed on each of the major and minor slopes 168, 170, 172 and 174. Each of the first and second sections 161 and 163 are pivotally attached to the vehicle 40 by hinges 180, which do not include elongated shanks 82.

Figure 9:
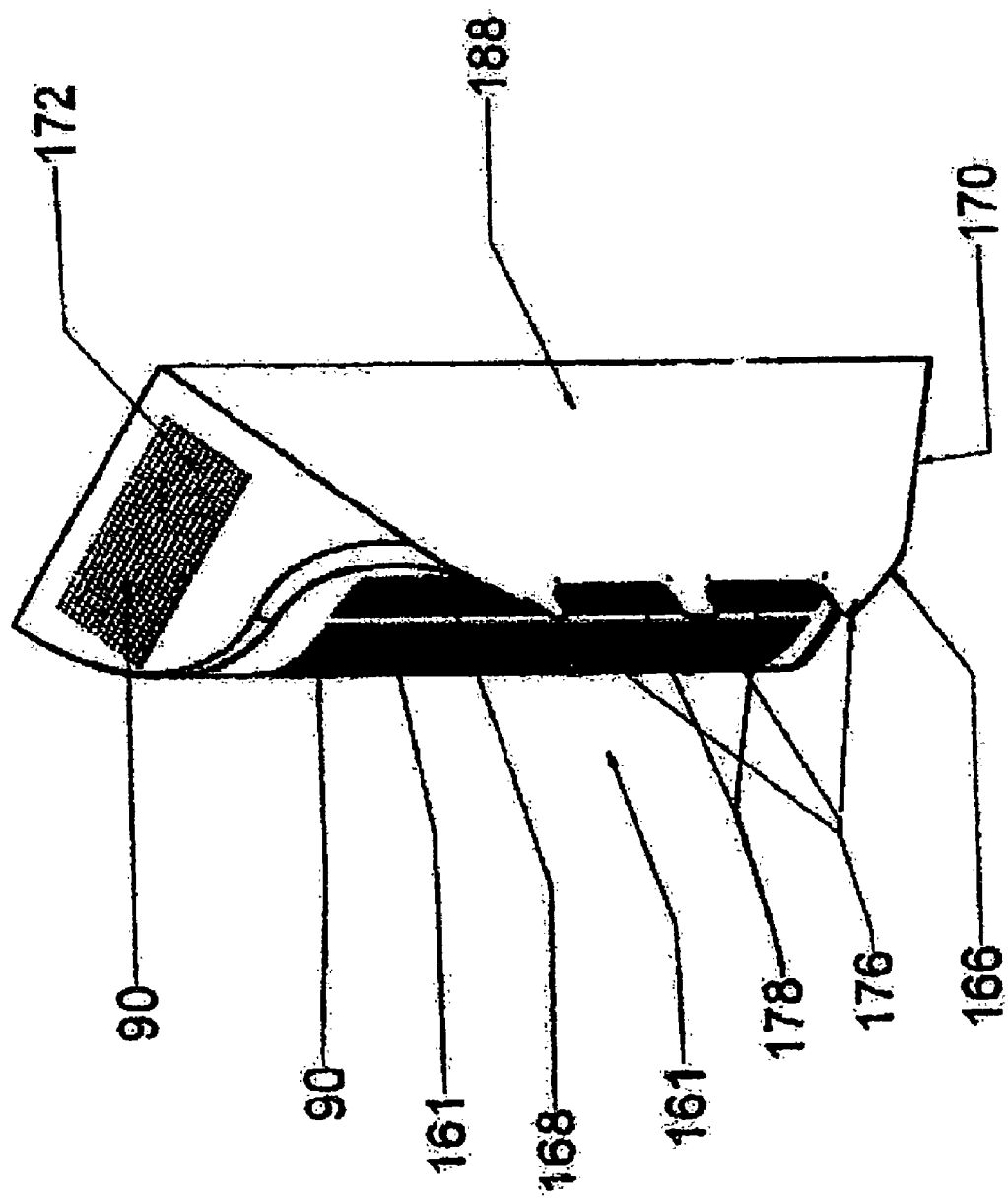
FIG. 9 is a perspective view of the first section of the airfoil of FIG. 8.

As shown in FIG. 9, the first section 161 of the body 162 is a generally hollow structure that includes a framework 188 supporting the outer face 164. The flow control apertures 90 are open to the outer surface of the outer face 164 and the interior of the body 162 which defines a plenum 194 when the first and second sections are connected over the rear of the vehicle 40.

The airfoils provided herein can be of varying size depending upon the size and configuration of the vehicles to which they are attached and the conditions in which those vehicles are operated. In the example of the body 62 of the airfoil 60 shown in FIGS. 2-5, the width of the body is approximately 102 inches and the length is approximately 120 inches. The length of the air ejector 78 is approximately 66 inches and its width is approximately 0.25 inches.

The bodies of the airfoils provided herein are generally thin-walled, relatively low mass structures that can be stamped from a light gauge low density metal, such as aluminum, or blown, molded or thermoformed from a polymeric material, such as high density polypropylene polycarbonates, silicone butyl rubber, acrylonitrile butadiene styrene, or other suitable materials. The weight of one embodiment can be about 250 lbs. or less. The bodies of the airfoils can be single layers, such as shown in FIG. 6, or include an interior wall that cooperates with the outer face 64 to form an interior plenum. In this case, where flow control apertures 90 and an air ejector 78 are provided, the apertures 90 and ejector 78 can be in fluid communication with this plenum, which generally can exhibit a lower air pressure than that exhibited on the surface of the outer face 64 when the vehicle 40 is in motion. Alternatively, such a plenum can be formed by the body 62 and the rear door, or wall of the vehicle 40.

The systems and airfoils provided herein can include one or more of the LFC features in various combinations. For example, an airfoil can include a plurality of flow control apertures 90 in fluid communication with an air ejector 78. In this case, air drawn through the flow control aperture 90 flows to the air ejector 78 where it exits the body 62 of the airfoil 60. The pressure differential generated between the surface of the outer face 64 directly adjacent to the flow control aperture 90 and the air ejector 78 can be generated by the Venturi effect acting on the air ejector 78. More particularly, without being bound to any particular theory, it is believed that when air is flowing over the outer face 64 past the air ejector 78 that a Venturi effect is initiated within the air ejector 78, whereby the rapidly flowing outer air draws air within the air ejector 78 outward into the moving stream. Air flowing over the outer face 64 at the flow control aperture 90 tends to be drawn into the aperture due to the pressure differential generated by the Venturi effect. The suction created at the flow control aperture 90 tends to cause the laminar flow of air to adhere to the surface of the outer face 64 thereby tending to reduce the occurrence of turbulence, thereby reducing the drag on the vehicle 40.

In situations where it is desired to supplement the pressure differential created by the Venturi effect at the air ejector 78, a pump 87, such as, for example, a vacuum or air pump, can be provided in fluid communication with the flow control apertures 90 and the air ejector 78. The pump 87, shown in phantom lines in FIGS. 2-5, can assist in drawing air through the flow control apertures 90 and directing it out through the air ejector 78.

Alternatively, in embodiments in which an air ejector 78 is absent from the airfoil 60, a pump 87 can still be provided in fluid communication with the flow control apertures 90, whereby the pump 87 provides essentially all of the pressure differential needed to draw air into the flow control apertures 90 from the surface of the outer face 64. In this case, the laminar flow over the outer face 64 can still be maintained by drawing air through the apertures 90 to the pump 87 where it can then be redirected to provide an overall reduction in turbulence.

In another alternative, the airfoil 60 can be provided without flow control apertures 90, but with an air ejector 78 and pump 87. In this case, air can be pumped out through the air ejector 78 by the pump 87 in order to provide an air profile at the rearmost point so as to reduce turbulence at the surface of the outer face 64 of body 62.

Further alternatives include systems with various combinations of one, two, three, four and all five LFC features, as well as the different embodiments of each feature provided herein.

While certain embodiments of the present invention have been disclosed herein, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative relationships and dimensions shown on the drawings are given as example relative relationships and dimensions, but the scope of the invention is not to be limited thereby.

What is claimed is:

1. An airfoil for a bluff body vehicle comprising:
a body mountable to the bluff body vehicle, wherein said body includes thereon at least two laminar flow control features selected from a curved and tapered airfoil surface, a flow control aperture, a flow control stub or dimple, and an air ejector.

2. The airfoil of claim 1, wherein said at least two features includes said air ejector in fluid communication with said flow control aperture.

3. The airfoil of claim 2, wherein said flow control aperture is frustoconical.

4. The airfoil of claim 2, wherein said flow control aperture includes a major diameter.

5. The airfoil of claim 2, wherein said air ejector and said flow control aperture are in fluid communication with a plenum formed in said body.

6. The airfoil of claim 2, wherein air flows from said flow control aperture to said air ejector when the bluff body vehicle is in motion.

7. The airfoil of claim 2, wherein said at least two laminar flow control features further includes said curved and tapered airfoil surface.

8. The airfoil of claim 7, wherein said air ejector is disposed in said curved and tapered airfoil surface.

9. The airfoil of claim 7, wherein said curved and tapered airfoil surface is hingedly mounted on said body.

10. The airfoil of claim 7, wherein said flow control aperture is formed on said curved and tapered airfoil surface.

11. The airfoil of claim 7, wherein said at least two features further includes said flow control stub or dimple.

12. The airfoil of claim 11, wherein said flow control stub or dimple is formed on said curved and tapered airfoil surface.

13. The airfoil of claim 11, wherein said flow control stub or dimple includes a major diameter.

14. The airfoil of claim 2, wherein said at least two features further includes said flow control stub or dimple.

15. The airfoil of claim 14, wherein said flow control stub or dimple includes a major diameter.

16. The airfoil of claim 1, wherein said at least two features includes said curved and tapered airfoil surface and said flow control aperture.

17. The airfoil of claim 16, wherein said flow control aperture is formed in said curved and tapered airfoil surface.

18. The airfoil of claim 16, wherein said flow control aperture is frustoconical.

19. The airfoil of claim 16, wherein said flow control aperture includes a major diameter.

20. The airfoil of claim 16, wherein said flow control aperture is in flow communication with a plenum formed in said body.

21. The airfoil of claim 16, wherein said at least two features further includes said flow control stub or dimple.

22. The airfoil of claim 21, wherein said flow control stub or dimple includes a major diameter.

23. The airfoil of claim 21, wherein said flow control stub or dimple is formed on said curved and tapered airfoil surface.

24. The airfoil of claim 1, wherein said at least two features includes said curved and tapered airfoil surface and said flow control stub or dimple.

25. The airfoil of claim 24, wherein said flow control stub or dimple is formed on said curved and tapered airfoil surface.

26. The airfoil of claim 24, wherein said flow control stub or dimple includes a major diameter.

27. The airfoil of claim 1, wherein said body includes a first section releasably connected to a second section.

28. The airfoil of claim 1, wherein said body is hingedly mounted to said bluff body vehicle, is such a manner as may facilitate the continued unimpaired use of preexisting, or traditionally designed and installed doors or other access portals.

* * * * *